US011499527B2

(12) United States Patent
Fynbo et al.

(10) Patent No.: US 11,499,527 B2
(45) Date of Patent: Nov. 15, 2022

(54) WIND TURBINE SERVICE OR CONSTRUCTION METHOD AND APPARATUS

(71) Applicant: Vestas Wind Systems A/S, Aarhus N. (DK)

(72) Inventors: Peter Fynbo, Ørsted (DK); Michael Kastrup, Ebeltoft (DK); Marcus Amery, Aarhus N (DK)

(73) Assignee: Vestas Wind Systems A/S, Aarhus N (DK)

( * ) Notice: Subject to any disclaimer, the term of this patent is extended or adjusted under 35 U.S.C. 154(b) by 723 days.

(21) Appl. No.: 16/471,900

(22) PCT Filed: Dec. 13, 2017

(86) PCT No.: PCT/DK2017/050426
§ 371 (c)(1),
(2) Date: Jun. 20, 2019

(87) PCT Pub. No.: WO2018/113878
PCT Pub. Date: Jun. 28, 2018

(65) Prior Publication Data
US 2020/0018287 A1     Jan. 16, 2020

(30) Foreign Application Priority Data

Dec. 21, 2016  (DK) .......................... PA 2016 71018

(51) Int. Cl.
*F03D 13/10*      (2016.01)
*F03D 13/40*      (2016.01)
(Continued)

(52) U.S. Cl.
CPC ............. *F03D 13/10* (2016.05); *F03D 13/40* (2016.05); *B64C 31/06* (2013.01); *B66C 23/185* (2013.01);
(Continued)

(58) Field of Classification Search
CPC . F03D 13/10; F03D 13/40; F03D 5/00; F03D 80/50; B64C 31/06; B66C 23/185;
(Continued)

(56) References Cited

U.S. PATENT DOCUMENTS

2006/0147308 A1    7/2006  Wobben
2008/0216301 A1    9/2008  Hansen et al.
(Continued)

FOREIGN PATENT DOCUMENTS

CN      103899490 A      7/2014
CN      104411965 A      3/2015
(Continued)

OTHER PUBLICATIONS

European Patent Office, International Search Report and Written Opinion in PCT Application No. PCT/DK2017/050426, dated Mar. 12, 2018.
(Continued)

*Primary Examiner* — Joseph Ortega
(74) *Attorney, Agent, or Firm* — Wood Herron & Evans LLP

(57) ABSTRACT

Method of lifting a wind turbine part (58) at a wind turbine site (1, 2), the method includes: providing a lifting apparatus (60) and a wind turbine part (58) to be lifted; providing a shield (40); providing manipulation equipment (45) associated with said shield (40); and suspending said part (58) from said lifting apparatus (60); moving said part (58) by means of said lifting apparatus (68); the method further including holding said shield (40) proximate and upwind of said part (58) being lifted by means of said manipulation equipment (45). The shield (40) may be held proximate the part (58) being lifted such that it acts to reduce the ambient wind force incident on the part (58). Preferably the method may be implemented such that wind speed conditions (w) at (Continued)

the part (58) being lifted are lower than ambient wind conditions (W) at said site (1, 2). A kite-flying apparatus includes a power kite (40) and associated manipulation equipment (45), including cables (42, 44) at least one steering winch (28, 29), the winch being received in a winching module (26) including a ballast receiving fitment and a winch control system.

18 Claims, 4 Drawing Sheets

(51) Int. Cl.
| | | |
|---|---|---|
| *F03D 80/50* | (2016.01) | |
| *B64C 31/06* | (2020.01) | |
| *B66C 23/18* | (2006.01) | |
| *F03D 5/00* | (2006.01) | |

(52) U.S. Cl.
CPC ............... *F03D 5/00* (2013.01); *F03D 80/50* (2016.05); *F05B 2230/6102* (2013.01)

(58) Field of Classification Search
CPC ......... F05B 2230/6102; F05B 2230/61; Y02E 10/70; Y02E 10/72; Y02E 10/727; Y02P 70/50
See application file for complete search history.

(56) References Cited

U.S. PATENT DOCUMENTS

2012/0032125 A1   2/2012   Diaz De Corcuera et al.
2015/0048621 A1*  2/2015   Smeenk .............. F03D 9/25
                                                290/55
2016/0046088 A1*  2/2016   Haag ................. F03D 80/55
                                                427/535

FOREIGN PATENT DOCUMENTS

| CN | 105283303 A | 1/2016 |
|---|---|---|
| DE | 3209368 A1 | 9/1983 |
| DE | 102004056340 A1 | 5/2006 |
| DE | 102013211751 A1 | 12/2014 |
| DE | 102016004348 A1 | 10/2016 |
| EP | 1677006 A2 | 7/2006 |
| EP | 2604568 A1 | 6/2013 |
| WO | 2008089763 A2 | 7/2008 |
| WO | 2013147600 A2 | 10/2013 |
| WO | 2014101735 A1 | 7/2014 |
| WO | 2014170232 A1 | 10/2014 |
| WO | 2015003733 A1 | 1/2015 |

OTHER PUBLICATIONS

Danish Patent and Trademark Office, Search and Examination Report in PA 2016 71018, dated Jun. 19, 2017.
China National Intellectual Property Administration, First Notification of Office Action in CN Application No. 201780083931.4, dated Jun. 19, 2020.
European Patent Office, Intention to Grant in EP Application No. 17816425.7, dated Jun. 29, 2022.

\* cited by examiner

WIND TURBINE SERVICE OR CONSTRUCTION METHOD AND APPARATUS

The present invention provides a method and apparatus for construction or servicing operations at a wind turbine generator.

BACKGROUND

It is known to assemble a wind turbine generator by attaching rotor blades to a rotor hub at a wind turbine nacelle atop a tower. According to US2006/0147308, this may be achieved by lifting and fitting the blades one by one using an appropriately dimensioned crane. The use of a crane for installing other wind turbine elements is also known. For example, EP2604568 relates to lifting a nacelle to a tower top; WO2008/089763 relates to the use of a crane to lift a rotor to an installed nacelle. Moreover, lifting operations in relation to a wind turbine may also be carried out for servicing purposes. For example, it is known e.g. from EP1677006, to lift wind turbine components into or out from an installed nacelle using lifting gear.

At the relevant operating heights of the wind turbine nacelle and crane, wind speeds can be elevated. After all, this forms the very reason for siting the turbine at the relevant location: namely sites are chosen for their reliable wind, and thereby for effective wind power generation. For practical and safety reasons, turbine construction using craning methods for blade attachment require low wind conditions. Also lifting operations in relation to other wind turbine elements or components preferably require low or moderate wind conditions. Among the various wind turbine elements or components to be lifted, the blades, being aerodynamically shaped and of particularly large dimensions, can be the most sensitive to wind conditions. Lifting operations may be required to cease during periods of locally higher winds, leaving costly plant equipment and personnel more or less idle.

The need to cease or delay lifting operations at a wind turbine when wind speeds increase, whether these be construction, installation or servicing operations, can significantly increase the cost of installing a turbine or wind park or the cost of service operations. Longer installation operations due to interruptions or delays or rescheduling as a result of momentary or persistent wind speeds in excess of safe construction conditions can thus adversely affect the cost profile of a project. In practice, a period of time in which wind turbine craning operation may be safely carried out may be called a lifting window. A lifting window may be considered as a period of time during which craning operations at a wind turbine may be safely carried out. Fewer or shorter lifting windows in an installation or service project will increase the overall time required and thereby increase the associated costs.

It is proposed to mitigate this problem by providing a method and equipment for increasing the effective lifting windows at a wind turbine installation or servicing site.

SUMMARY OF THE INVENTION

Accordingly, a method is proposed according to which, a local wind shadow is created in the vicinity of a lifting operation at a wind turbine. This is achieved by holding a wind shield upwind of a part being lifted. The shield may be held sufficiently proximate to the part being lifted to reduce the local wind at the relevant part and thereby to reduce the effect of the local wind on the relevant part. Preferably, the shield has dimensions comparable to or larger than the part being lifted.

During higher than preferred ambient wind conditions, the shield may thereby create a certain lee in which a part can be suspended, moved or fixed in place, e.g. at a wind turbine or loaded e.g. onto a trailer. In this way, any lifting window at a construction or installation or servicing site may be extended, thereby reducing plant or operator idle time and thereby lowering associated costs.

The method may be implemented when local wind conditions are below or above the nominal wind limit for lifting. In aspects, a wind shield may be temporarily held at relevant location proximate a part being lifted. In aspects, a wind shield may be transported to a wind turbine site prior to a relevant construction or service operation. In aspects, a wind shield may be deployed at a relevant site if or when wind speed conditions appear to be approaching or exceeding a nominal limit value for craning. In aspects, a deployed wind shield may be deployed at a relevant site if or when wind speed conditions appear to be approaching or exceeding a nominal limit value for craning.

Preferably, the wind shield may be movable. The wind shield may thereby be transported to or from a construction or service site. The shield may preferably be manipulated i.e. steered into position proximate a part being lifted during a lifting operation. The shield may be manipulated, i.e. steered away from a part being lifted, in particular at the end of a lifting operation or at the end of a critical phase of a lifting operation or after ambient wind conditions at a lifting or service site fall below a nominal or critical limit.

Preferably, a wind shield may be controlled such that it may follow the progressive movement of part being lifted, thereby maintaining a wind shadow around or at said part while the part is in motion e.g. suspended from a lifting apparatus.

Preferably, the wind shield may be an aerodynamic body capable of flight or tethered flight. Preferably, the shield may have a continuous or substantially continuous surface capable of obstructing air flow when held against a flow of air. Preferably the wind shield may be collapsible.

Preferably, the shield may be held aloft using tethered cables. Preferably, one or more tethered cables may co-operate with a winch. Preferably a winch associated with a tethering cable may be a powered winch, preferably an electric motorised winch. A tethered wind shield may be held aloft by virtue of the effect of the wind on its aerodynamic shape. Preferably the method is implemented using a shield which is in flight.

In aspects, a part being lifted, and which may be shielded from wind using a shield according to aspects of the invention, may comprise an element of a wind turbine, such as a blade or nacelle or hub or tower segment. Still further, a part being lifted may comprise a component of a wind turbine, such as a generator or gearbox or a sub-component thereof. In aspects, the invention may be applied to components which are ancillary components of a wind turbine.

Preferably, the shield may be held aloft using tethered cables. Preferably, one or more tethered cables may co-operate with a winch. Preferably a winch associated with a tethering cable may be a powered winch, preferably an electric motorised winch. A tethered wind shield may be held aloft by virtue of the effect of the wind on its aerodynamic shape. Preferably the method is implemented using a shield which is in flight.

Preferably, a wind shield may be steered into position by controlling tethered cables. Preferably, a wind shield may be steered into position by controlling tethered cables. Hence, tethering cables may be control cables. Tethering cables may include power cables and brake cables. Some cables may be emergency guy cables. Some or all tethering cables may be on winches. A winches may include a powered rotary drive. Winches may be associated with a control system. Winches may be comprised in a winching module. A winch module may be restrained by ballast. For example, a winch module may be a truck or container or construction comprising one or more winches and optionally a ballast element. A winching module may include or be associated with a control module. A control module may be part of a control system. A control system may be an automatic control system. Winches may be fixed to the ground. Winches may be fixed to ground-based mobile platforms. Winches may be carried on a truck bed.

Shield control cables may be held aloft using a ground-based structure such as a tall structure such as a mast or a crane. A winch module associated with these control cables may be on ground, with control cables supported via an intermediate sheave or block. Such an intermediate sheave or block may be held aloft by a crane or other ground-based structure.

Alternatively, a winch module may be held aloft, suspended from a crane or other tall structure.

The wind shield may be a power kite. For example, it may be a rigid power kite with struts, or partially rigid, including some struts. An example of a rigid kite may be a delta kite or lozenge shaped kite or any other common or suitable shape. Alternatively, the shield may be a semi-rigid kite, such as a closed cell kite, with no struts or with few struts. Still alternatively, the shield may be a non-rigid kite such as an open cell kite with no struts. Preferably, the shield may be self-launchable, such a self-launchable kite.

Semi-automatic control of the shield may be carried out using control wires wound on motorised winches, with winch-control, and thereby control of the shield in flight being controlled by an operator. To this end, an operator may use a control console. In automatic control of the shield, the winch control for controlling the shield may be automated for example using software and a control system linked to the winches.

Preferably, the shield may have a maximum dimension comparable to or larger than at least one cross-dimension of the part being lifted. Preferably, during the method of the invention, a position of the shield proximate said part may include a minimum distance between said shield and said part comparable to a maximum dimension of said part. Preferably, during the method of the invention, the shield may be held sufficiently proximate the part being lifted to create a full or partial wind shadow at the relevant part. Preferably, the proposed method is operated such that it acts to reduce the wind force on the part being lifted. That is to say that by means of this method, and while the method is being implemented in respect of a relevant part, the wind force acting on the part being lifted is momentarily less than the wind force which would act on the part in the absence of said shield.

In aspects, there may also be a method of shielding a wind turbine part at a wind turbine site, the method including: providing a shield; providing manipulation equipment associated with said shield; and the method further including holding said shield, preferably in flight, proximate and upwind of said part, said shield being held aloft by means of said manipulation equipment; wherein said part is a wind turbine rotor blade or a wind turbine nacelle or a wind turbine tower portion; and wherein said method is performed during an external servicing operation at a wind turbine rotor blade or nacelle; or wherein said method is performed during a rotation operation of a rotor blade, for example, at a wind turbine blade of an unbalanced rotor, during a rotation operation of said unbalanced rotor.

The proposed improved lifting method is defined in appended claim 1. Further preferred features of the method are defined in subclaims 2-17. A relevant apparatus is defined in appended claim 18. Further preferred features are defined in subclaims 19-20. A further method aspect is defined in appended subclaim 21.

Some aspects and features of the method and equipment will be explained by way of non-limiting example with reference to appended drawings, in which.

Figure 1:
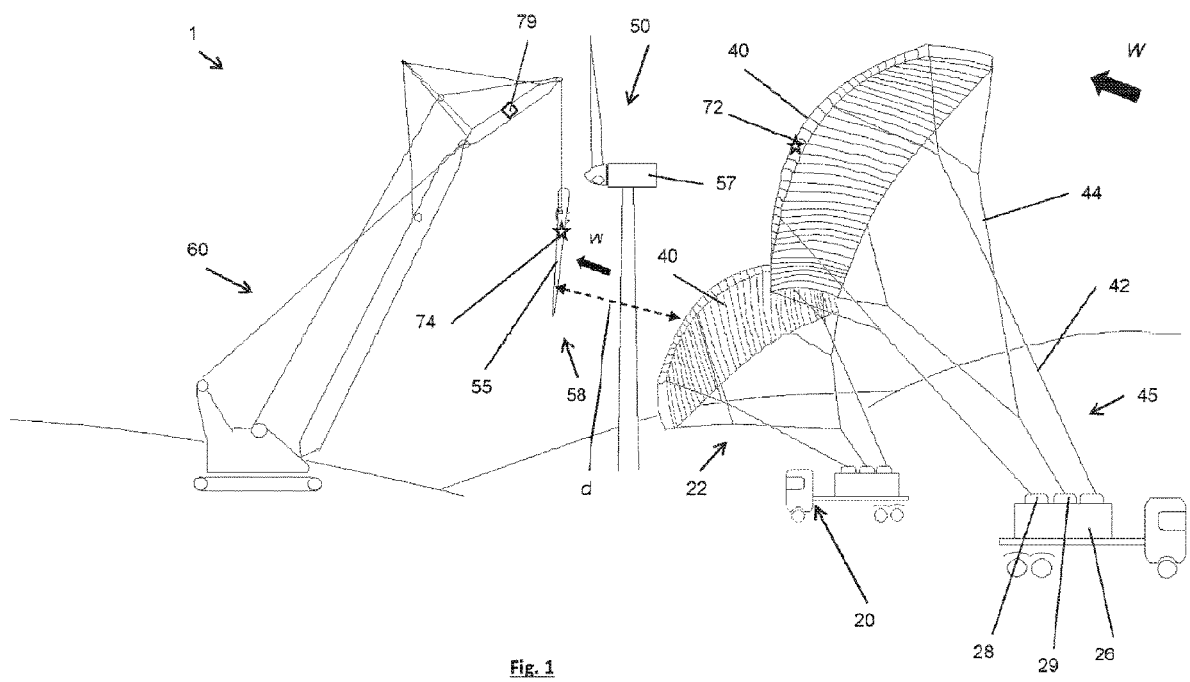
FIG. 1 shows a not-to-scale example of a shield in use at a wind turbine construction site.

In FIG. 1 there is illustrated a wind turbine construction site 1, including a partially constructed wind turbine 50. The example illustrates a wind turbine part 58 being lifted. In the example shown the wind turbine part 58 is a wind turbine element, which is shown as a blade 55, although it could equally well be a different element such as a nacelle 57, hub 59 or a tower segment 56 (a tower segment is indicated in Fig. with the aid of a dotted line across the tower). The lifting apparatus 60 could alternatively lift a wind turbine component such as a transformer or gearbox or mainshaft or other large internal component. The lifting apparatus 60 illustrated is a crane, specifically a crawler crane, although other types of crane or lifting apparatus 60 may be used. Momentary, ambient wind speed W at the site 1 is illustrated by a solid directional arrow.

Under normal circumstances, when ambient wind conditions W exceed a nominal limit lifting wind speed, lifting operations or service operations at a wind turbine are required to cease, for safety and practical, operational reasons. Wind speeds W above the nominal limit lead to an interruption, cessation or delay of lifting and thereby of construction operations. According to aspects of the invention, when wind speeds reach a level above or near to the nominal limit wind speed, there may be initiated a method of reducing the wind speed at a part 58 being lifted. A wind shield 40 may be deployed and held up close enough to the part 58 being lifted to create a wind shadow around the relevant part, thereby reducing the wind speed at the part 58 to a lower level w indicated by a smaller solid arrow. The wind shadow can be maintained by bringing and maintaining a shield 40 within a distance d proximate the part 58 being lifted.

A closer proximity to the part being lifted provides a more effective shadow. For risk mitigation reasons, it may be preferred to adjust the operating distance d between the shield 40 and the part 58 depending on the dimensions of the part 58. In the case illustrated, the operating distance d between the suspended blade 55 and the shield 40 may be not less than a maximum chord length of the blade. In other aspects, the distance d may be adjusted to a different value depending on the size of the shield or depending on another significant dimension of the part 58.

The shield 40 illustrated in FIG. 1 may comprise a substantially continuous surface in the form of a canopy. As illustrated, the shield 40 is a power kite. The power kite may be open celled and non-rigid or closed-celled and partially rigid or semi-rigid. A semi-rigid power kite may be non-rigid when collapsed and partially rigid when deployed. In other aspects, the shield may comprise a kite with struts. In some aspects a power kite may be partially rigid and including struts. When required, a shield 40 may be manually deployed from the ground and steered into position proximate a part 58 being lifted. As long as ambient wind speeds Ware sustained above or near the predefined nominal limit wind speed, the shield may remain deployed and held proximate a part 58 being lifted, thereby enabling the lifting operation to continue uninterrupted. If the ambient wind speed W falls to below the nominal limit wind speed for lifting operations, and if it remains below the nominal limit wind speed for a sustained period of time, the shield 40 may be collapsed and retracted. A decision to begin or to cease operating the shield 40 may also be based partly or fully on local meteorological forecast information. If the ambient wind speed W rises to a level above a predefined upper maximum limit for carrying out a lifting operation using a shield, the shield 40 may be collapsed and retracted. An upper maximum limit for carrying out a lifting operation using a shield, may be defined when the wind speed w at the part being lifted exceeds a predefined nominal limit. This speed w may be known as the wind shadow speed.

Still referring to FIG. 1, a shield may be held aloft by tethered cables 44, 42. In particular, in preferred aspects, the tethered cables may be relayed to one or more winches. As shown in FIG. 1, the shield 40 may be a conventional kite such as a power kite, capable of being controlled and steered by wires in the manner of any kite or power kite. In particular, a shield 40 may have a trailing edge, and a leading edge, connected by a canopy. A bridle 22 connected to cables 42, 44 connects a canopy of the shield 40 with the anchoring and steering arrangements for the shield 40, such as winches 28, 29 and a control system if applicable. In FIG. 1, a manipulating apparatus 45 may comprise a bridle 22 associated with cables 42, 44 and a winching module 26 which performs both functions of anchoring the shield 40 and controlling its flight. Advantageously, the bridle 22 may be attached to a steering system including power cables 42 and a brake system including brake cables 44. When both sets of cables 42, 44 are held in tension, the shield 40 may be operational to be held proximate a part 58 being lifted and effective to partially or fully block wind W. For depowering a shield 40, one or more brake cables 44 may be slackened to increase air escape out from the trailing edge of the shield 40. Conversely, in order to re-power the shield 40 in the wind, the brake cables 44 may be taken up, i.e. tension may be applied to them e.g. by pulling on them or winding them in. If required, a shield 40 may be abruptly collapsed by sudden release of the brake cables 44. Steering left or right may be carried out by selectively drawing in a corresponding right or left power cable 42. In the example shown, the power cables 42 at a respective port and a starboard side of the shield 40 are each relayed to a respective steering winch 28. In the example shown, the brake cables 44 at a respective port and a starboard side of the shield 40 are all relayed to a brake winch 29. Other configurations may be chosen, in keeping with e.g. known kite control systems. In the example of FIG. 1, each winch 28, 29 is preferably independently controllable and constitutes an anchor point for a respective cable. Each winch also constitutes an element of a shield control mechanism and thereby forms part of the shield's manipulating apparatus 45.

The winches 28, 29 are received in a winch module 26 which, in the case illustrated is placed fixed atop a mobile platform 20, shown by way of example as a bed-type truck. The winch module 26 may advantageously include a ballast system. The ballast system may comprise a ballast fitment such as e.g. a tank for adding liquid or fluid ballast such as water or sand. Or the ballast system may e.g. include an appropriate amount of a heavy material. In any event, the ballast system may be capable of stabilising the shield 40, such that it can maintain and sustain a steady position in flight, in particular, proximate to a part 58 being lifted.

Figure 2:
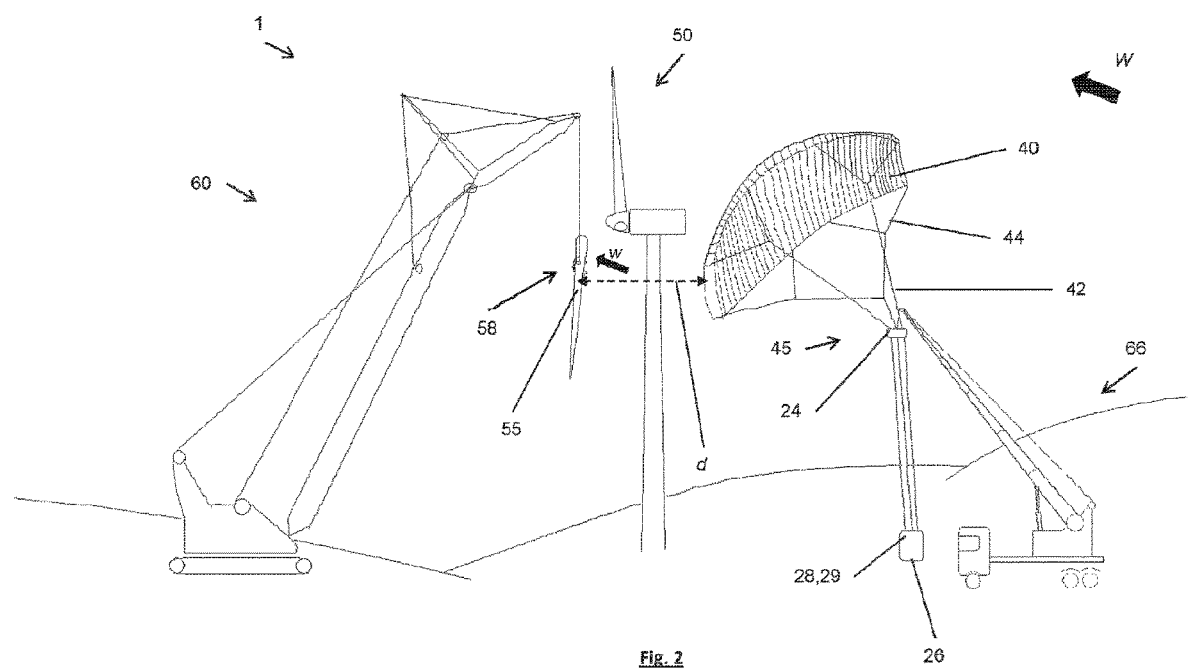
FIG. 2 shows a not-to-scale alternative example of a shield in use at a wind turbine construction site.

In FIG. 2, there is illustrated an alternative example, in which the winching module 26 may be positioned supported on the ground, while the cables 42, 44 may be relayed over a pulley-block 24. The pulley block may be suspended from or atop a second lifting apparatus 66 shown by way of example in the form of a mobile telescopic boom crane. In this example, the range of flight of the shield 40 may be relatively restricted in view of the short length of the free cables 42, 44 between the pulley block 24 and the shield 40. With the free cables 42, 44 running from close to ground level as per the example in FIG. 1, the flight range of the shield 40 may relatively greater. For some applications, a more restricted movement range of the shield 40 may be desirable and may ease overall positional control in relation to the part 58 being lifted. In aspects, the pulley block 24 may be secured against swinging action or against rotation using taglines (not shown) running between the pulley block 24 and an anchor, preferably at ground level.

Figure 3:
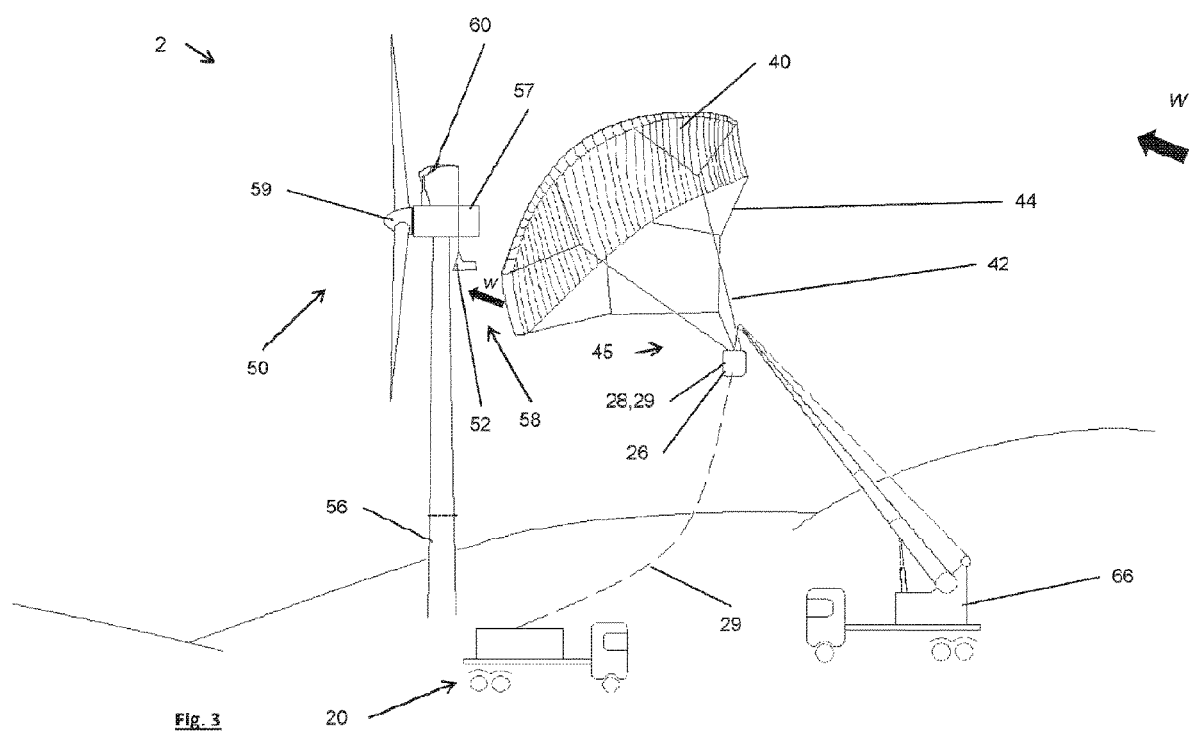
FIG. 3 shows a not-to-scale example of a shield in use during wind turbine service operations.

In FIG. 3, a still further example is shown in which the winch module 26 may be suspended from or atop a second lifting apparatus 66 at a wind turbine service site 2. In this example also a ballast included in the winch module 26 is suspended from the secondary lifting apparatus 66, as part of the winch module. This gives stability to the winch shield 40. Optionally, the examples of FIGS. 2 and 3 may be most effectively implemented when lifting comparatively smaller elements or components 58. In FIG. 3, the part 58 being lifted may be an internal wind turbine component 52. The exemplary lift is being carried out by means of a lifting apparatus 60 in the form of a nacelle crane. A nacelle winch or other lifting apparatus 60 could equally well be used. Also visible in FIG. 3 is a tag line 29 running between the suspended winch module 26 and a ground anchor, shown here by way of a mobile platform 20, such as a truck.

Figure 4:
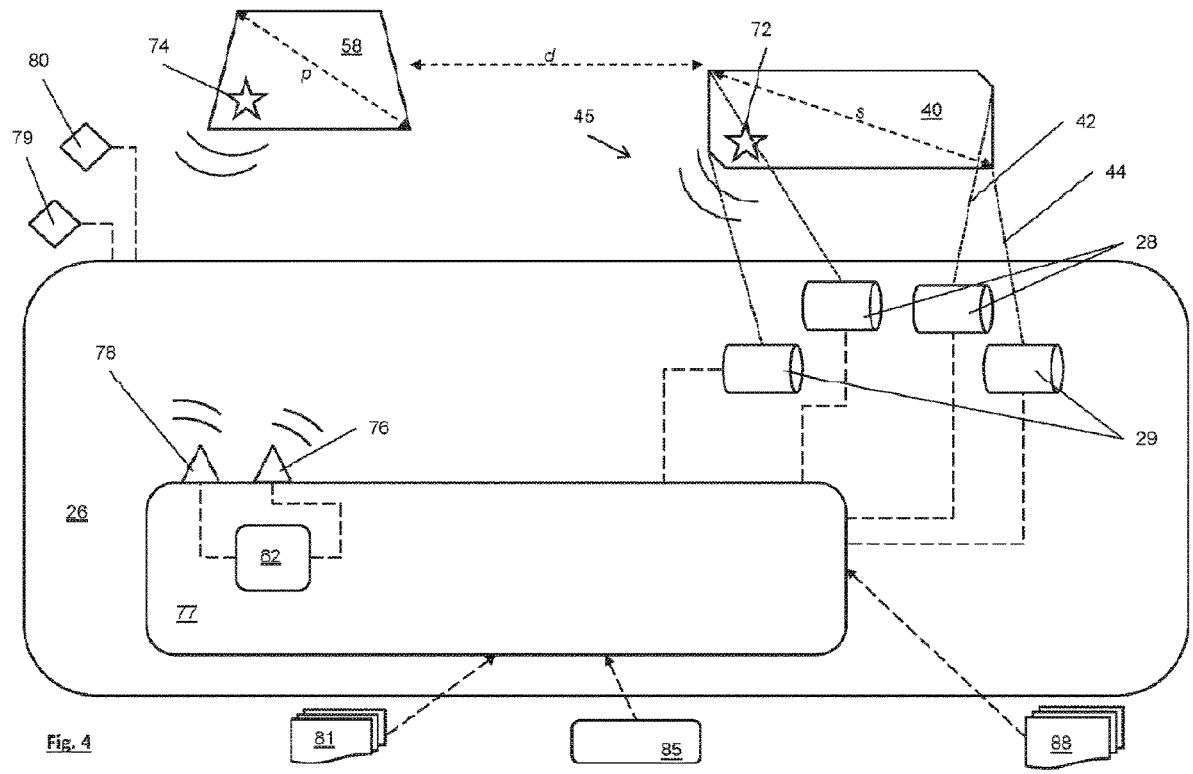
FIG. 4 shows a schematic not-to-scale diagram of aspects of exemplary equipment for implementing aspects of the method.

In further aspects, as illustrated for example in FIG. 4, the manipulating apparatus 45 may include a control system 77. The control system 77 may optionally be comprised a part of a winch module 26. It may be may be semi-automatic, and may comprise for example a control console (not shown) to be operated by an operator. The control console may include at least a control actuator for steering and a control actuator for increasing or decreasing air escape at the shield 40. A steering actuator may in particular be associated with a drive motor at a steering winch 28 or a set of powered steering winches 28. An air escape actuator, or brake actuator may be associated with a drive motor at a brake winch 29 or a set of powered brake winches 29. In this way an operator may manipulate the shield 40 into position and maintain it in the desired position. If required, the shield 40 may be easily steered to follow the movement of a part 58 being lifted. Preferably the control console may include an emergency, automatic collapse and retraction control switch.

In a further aspect, the control system 77 may comprise a fully automatic system including shield control software 88 for steering the shield 40 to port or starboard (left or right) and for raising or lowering the shield 40. The control system 77 may include ambient wind speed W detection or input apparatus or may otherwise receive regular ambient wind speed transmissions from a wind speed information source 81 such as sensors or a forecasting source.

For improved control of the shield 40, according to any aspects of the method and equipment disclosed herein, there may be provided a position indicator 74, 72 at a part 58 being lifted or/and also at the shield 40. These may be transponders such as for example RFID tags or GPS receiver-emitters or any other position-indicating emitter device. These may communicate with one or more dedicated receiver 76, 78 at the control system 77. A detection system 82 associated with the control system 77 may monitor in real time the respective positions of a shield 40 or/and a part 58 being lifted. The control system 77 may additionally or alternatively receive information or monitored values representing wind direction and wind speed from wind speed or direction sensors 79, 80 which sensors 79, 80 may form part of the control system 77 or manipulating apparatus 45. Optionally, a wind speed sensor 80 may be positioned at a part 58 being lifted and may transmit its sensed values to the control system 77. Optionally, a wind speed sensor 79 may be positioned for local wind speed measurement such as at a lifting apparatus 60, e.g. on an exposed crane boom section or exposed jib section. By way of example, a wind speed sensor 79 may be positioned on a lifting apparatus 60 in use lifting a relevant part 58. In this way, the control system 77 may receive input information e.g. from an operator via an input interface 85 and sensory or data inputs representing weather and/or positional information of the part 58 and shield 40. Input information via interface 85 may for example include wind limit thresholds such as nominal limit values, maximum and minimum values and/or required proximity d to be maintained between a relevant part 58 and the shield 40. In aspects, the controller 77 may call up predetermined data from a databank including data such as records of wind turbine elements or components to be lifted, with their corresponding predetermined wind speed nominal limits for craning. The file for a given part 58 may include the required maximum or minimum proximity distance d from the shield 40. Equally, a data file may include look up tables for different shields 40 which may be used with the manipulating apparatus 45, including proximity data relevant for the particular selection of shields available. A user may simply input a shield 40 type to be used and a part 58 type to be lifted, following which the system 77 will automatically generate and/or automatically apply applicable predetermined wind speed maxima and minima limit values and/or emergency limit values for collapsing and retracting a wind shield 40. The system 77 may thereafter operate automatically, launching a shield 40 when required based on input weather or wind data and controlling the steering winches 28 and braking winches 29 as required, for the maintaining the required position or flight of the shield 40 in relation to the part 58 being lifted.

In further aspects, a position indicator 72 provided at a shield 40 may transmit signal information to a receiver associated with the position indicator 74 at a part 58 being lifted. In this way, the position indicator 74, and an associated receiver, may constitute or be operated as a proximity sensor. Preferably, according to this aspect, the position indicator 74 may transmit proximity data to said control unit 77, representing a distance between said shield 40 and said part 58. Conversely, a position indicator 72 provided at a part being lifted 58 may transmit signal information to a receiver associated with the position indicator 72 at a shield 40. In this way, the position indicator 72, and an associated receiver, may constitute or be operated as a proximity sensor. Preferably, according to this aspect, the position indicator 72 may transmit proximity data to said control unit 77, representing a distance between said part 58 being lifted and said shield 40. In other words the shield 40 and part 58 may comprise transmitter and receiver elements configured to indicate a separation between the two. The method may include transmitting from a position-indicator 72 or 74, a signal indicative of a separation distance between said shield 40 and said part 58, to said a control system receiver 78, 76.

In aspects, a warning alarm may be triggered if the control system 77 detects that the part 58 being lifted and the shield 40 are too close together, e.g. below a predetermined absolute minimum distance y apart. The warning alarm may sound in either or both a semiautomatic, operator controlled system or method, or in a fully automatically controlled method or apparatus.

In further aspects, the shield manipulation system 45 may be operated in a semi-automatic mode by selecting a target value for the separation distance d between the shield 40 to be used and the relevant part 58 being lifted. This may be done automatically using a control system 77 output based on input data, e.g. via an input interface 85, for the relevant part 58 type and the relevant shield type 40 and based either on the control system's calculation or on stored look-up type data, or both. A target value for the separation distance d may also be selected manually and input by a user, e.g. via input interface 85. Hence, a separation distance d may be adopted and referred to as a target separation distance. The control system 77 may select and apply a tolerance range T(+) and T(−) above and below the target value for the separation distance d, or this may be selected and input manually. For example, a tolerance range of 10% or 15% or 20% or more above and below the target value for the separation distance d may be selected. Other values may be selected as appropriate for a given set of circumstances. For example, a set of tolerance values may be chosen with a higher upper tolerance range T(+) than the lower tolerance range T(−). This may for example allow the shield 40 to be held and maintained in operation close to a recommended minimum separation distance d. In aspects, a target value for the separation distance d may be chosen to correspond with a minimum recommended operating separation distance for a given part 58 and shield 40 combination. The operator may then manipulate the shield 40, once aloft, so that it stays at or close to a selected target value for the separation distance d from the part 58 being lifted. This may be achieved using controls associated with winches 28, 29 for the cables 42, 44. In aspects, the control system 77 may sound a control alarm signal if the upper tolerance limit T(+) is reached during operation of the shield 40, for example a high pitched audio signal or a high frequency vibration of a user's operating console. This may prompt the user to control the shield 40 to move further towards the target value for the separation distance d in relation to the part 58 being lifted i.e. towards the part 58 being lifted. The control system 77 may sound a control alarm signal if the lower tolerance limit T(−) is reached during operation of the shield 40, for example a low pitched audio signal or a lower frequency vibration of an operating console. This may prompt the user to control the shield 40 to move further towards the target value for the separation distance d in relation to the part 58 being lifted, i.e. away from the part 58 being lifted. Steering control alarms may be distinct and distinguishable from previously mentioned warning alarms. In this context, a lower tolerance value T(−) for the separation distance d may be distinct from an absolute minimum limit distance y. In particular, target values for the separation distance d and associated tolerance limits T(+) and T(−) may be used for steering and control purposes of the shield. Whereas an absolute minimum limit distance y may be applied as an additional safety measure, possibly in associated with an instruction to cease operations or with an automatic collapsing mode of the control system 77.

In a still further aspect, the control system 77 may operate in a fully automatic shield 40 control mode as discussed above, using an internal target value for the separation distance d and applying upper and lower tolerance values T(+) and T(−) to gain steering flexibility for maintaining the shield 40 as close as possible to the target separation distance d. In examples, preferably, the shield 40 may have a maximum dimension s comparable to or larger than the maximum dimension p of the part 58 being lifted. Where the part 58 being lifted is a wind turbine blade 55, preferably, the shield 40 may have a maximum dimension s larger than the maximum chord dimension of the wind turbine blade 55. Where the part 58 being lifted is a wind turbine nacelle 57, preferably, the shield 40 may have a maximum dimension s similar to or larger than a maximum height dimension of the nacelle 57 (excluding antennae or such like atop the nacelle). Where the part 58 being lifted is a wind turbine hub 59, preferably, the shield 40 may have a maximum dimension s similar to or larger than any dimension of the hub 59. Where the part 58 being lifted is a wind turbine component 52, preferably the shield 40 may have a maximum dimension s similar to or larger than any maximum dimension p of the component 52.

In a further aspect, a control mode of the control system 77 may additionally determine a difference value between a sensed local wind condition W from a sensor 79 and a sensed value w from a sensor 80 at a part 58 being lifted. The size of the difference value may be used to adjust and maintain the shield 40 position towards or away from the part 58 being lifted. In particular, if a determined difference value between a sensed local wind condition W and a sensed value w from a sensor 80 at a part 58 being lifted is larger than a target difference value, the control system 77 may to adjust and maintain the shield 40 position closer to the part 58 being lifted. If a determined difference value between a sensed local wind condition W and a sensed value w from a sensor 80 at a part 58 being lifted is lower than a target difference value, the control system 77 may to adjust and maintain the shield 40 position further away from to the part 58 being lifted.

Preferably, during aspects of the method proposed herein, a position of the shield 40 proximate said part 58 may include a minimum distance d between said shield 40 and said part 58 less than three times a maximum dimension s of said shield 40. Still preferably, a position of the shield 40 proximate said part 58 may include a distance d between said shield 40 and said part 58 less than two times a maximum dimension s of said shield 40. Optionally, a position of the shield 40 proximate said part 58 may include a minimum distance d between said shield 40 and said part 58 less than a maximum dimension s of said shield 40. Optionally, a position of the shield 40 proximate said part 58 may include a minimum distance d between said shield 40 and said part 58 less than five times a maximum dimension p of said part 58. Still preferably, a position of the shield 40 proximate said part 58 may include a minimum distanced between said shield 40 and said part 58 less than four or three or two times a maximum dimension p of said part 58. Optionally, a position of the shield 40 proximate said part 58 may include a minimum distance d between said shield 40 and said part 58 less than a maximum dimension p of said part 58. Where the part 58 being lifted is a wind turbine hub 59, preferably, a position of the shield 40 proximate said hub 59 may include a minimum distanced between said shield 40 and said hub 59 less than four times a maximum dimension of said hub 59. Where the part 58 being lifted is a wind turbine blade 55, preferably, a position of the shield 40 proximate said wind turbine blade 55 may include a minimum distance between said shield 40 and said wind turbine blade 55 less than a maximum dimension of said blade 55. Where the part 58 being lifted is a wind turbine nacelle 57, preferably, a position of the shield 40 proximate said nacelle 57 may include a minimum distance d between said shield 40 and said nacelle 57 less than two times a maximum dimension of said nacelle 57. Where the part 58 being lifted is a wind turbine hub 59, preferably, a position of the shield 40 proximate said hub 40 may include a minimum distance d between said shield 40 and said hub 59 less than four times a maximum dimension of said hub 59. Where the part 58 being lifted is a wind turbine tower segment 56, preferably, a position of the shield 40 proximate said tower segment 56 may include a minimum distance d between said shield 40 and said tower segment 56 less than three times a maximum diameter of said tower segment 56. Where the part 58 being lifted is a wind turbine component 52, preferably, a position of the shield 40 proximate said component 52 may include a minimum distance d between said shield 40 and said component 52 less than five times a maximum dimension p of said component. Still preferably, a position of the shield 40 proximate said component 52 may include a minimum distance d between said shield 40 and said component 52 less than four or three or two times a maximum dimension p of said component 52. Optionally, a position of the shield 40 proximate said component 52 may include a minimum distance d between said shield 40 and said component 52 less than a maximum dimension of said component 52. In the present specification, a separation distance d may be adopted and referred to as a target separation distance.

Features disclosed or claimed in this specification may be combined together in any way appropriate. Possible combinations of features disclosed herein, may be limited only by the laws of physics or by combinations which may be manifestly impossible for other reasons.

In the above, a wind turbine blade 55 or nacelle 57 or hub 59 or tower segment 56 or PCM (not shown in the drawings) has been referred to as a wind turbine element. Lifting operations for which the method disclosed herein may be relevant can also include lifting other assemblies such as in particular wind turbine components 52 including components associated with the drivetrain such as such as a gearbox or main shaft, or power components such as a generator or converter or transformer. This is not an exhaustive list of elements or components 52. The lifting of any element or component 52 may be referred to as lifting a part 58. Lifting a part 58 may in particular be carried out in connection with installation or construction or servicing operations. In general, although not exclusively, where a part 58 being lifted is a nacelle component 52, the relevant operation may in particular be a servicing operation. Parts 58 being lifted may be suspended or supported on a suspended platform. In general although not exclusively, where a part 58 being lifted is a wind turbine element, the relevant operation may in particular be an installation operation. References to craning or to craning operations may be synonymous with references to lifting or lifting operations. A tethering cable may take the form of a tethering line or control line or guide line or steering line or other tag line 29.

A lifting window may be understood as a period of time during which wind speeds W are below a maximum limit value for craning. This wind speed limit value may be referred to as a wind limit or nominal wind limit or lifting wind limit. The term "local wind" is used to designate the ambient wind W at a given object or location 1, 2. Ambient wind W may be a momentarily prevailing wind condition, in particular a wind speed or wind direction or both. A full or partial wind shadow may be understood as reduction in ambient wind force at a particular location or object. A reduced wind speed w may in particular imply a reduced wind force incident on a relevant object. In the present context, a maximum dimension of a shield 40 may be measured across a canopy region of said shield 40. Preferably, a maximum dimension may be measured in a laid-out flat condition of the shield 40; for example from corner to corner.

In alternative embodiments, a shield 40 may be used in a method to shield wind from mounted blades 55 or from a mounted rotor. In particular, a shield 40 or kite may be used to shield wind from mounted blades 55 or from a mounted rotor during rotation of the rotor. This may assist, for example in a method for reducing wind load on a rotor or blade 55 during turning of the rotor. The use of a shield 40 in this way may reduce the wind load on a rotor in an unbalanced state thereof, in particular, during rotation of an unbalanced rotor. An unbalanced rotor is a rotor not comprising all its blades, i.e. with fewer than a complete set of blades attached to its hub. The rotation of an unbalanced rotor, e.g. of a rotor comprising only a single blade or two blades out of a set of three, may be needed during a construction phase of a wind turbine. Rotating a rotor in its unbalanced state can put a strain on some components of the turbine: it being understood that ordinarily, during operation of a turbine, the rotor drives the generator mechanism, and not the other way round. Hence, it can be beneficial to reduce turning loads when rotating a rotor or unbalanced rotor, using elements of the generator mechanism, possibly including gearbox elements. Where a turner gear is mounted to the generator components, for the purpose of rotating an unbalanced rotor, the use of a shield 40 for reducing wind loads on a mounted blade may serve to reduce loads on the turner gear and may thereby increase the range of environmental conditions under which a n unbalanced rotor can be rotated. Hence, in aspects a shield 40 may be used during construction of a wind turbine, or during rotation of an unbalanced rotor thereat.

In still further aspects, a shield 40 may be used in a servicing method for a wind turbine, e.g. at a wind turbine blade, or wind turbine nacelle. To this end, a shield may be flown or controlled to be moved to a location upwind and in proximity to a servicing implement brought to a wind turbine blade at a wind turbine. A shield may be flown or controlled to be moved to a location upwind and in proximity to a servicing implement during a service operation at said blade. A shield 40 may be flown or controlled to be moved to a location upwind and in proximity to a team of one or more servicing operatives at a wind turbine blade at a wind turbine, e.g. during performing a servicing task at a wind turbine blade. The same method may be applied during service of a wind turbine nacelle, especially to external portions thereof. Servicing tasks can typically include inspection and/or repair and/or cleaning and/or maintenance tasks. For assisting with providing a wind shadow at a mounted blade e.g. during rotating an unbalanced rotor, or for providing a wind shadow in association with service tasks at elements of a wind turbine, the control of a shield may be performed in the same way as previously described in connection with wind turbine construction. The same methodologies may be applied for example when winching loads such as wind turbine components to or from a wind turbine nacelle.

The invention claimed is:

1. A method of lifting a wind turbine part at a wind turbine site, the method including:
   providing a lifting apparatus and the wind turbine part to be lifted;
   providing a shield;
   providing a manipulation equipment associated with said shield;
   suspending said wind turbine part from said lifting apparatus;
   moving said wind turbine part by means of said lifting apparatus;
   the method further including;
   holding said shield aloft, proximate and upwind of said wind turbine part being lifted, by means of said manipulation equipment.

2. The method of claim 1, wherein said shield is held at a minimum distance from said wind turbine part equal to or less than three times a maximum dimension of said shield.

3. The method of claim 1, wherein said shield is held proximate said wind turbine part such that it acts to reduce the ambient wind force incident on said wind turbine part.

4. The method of claim 1, wherein said shield is movably held in relation to said wind turbine part being lifted, wherein said method includes moving said shield to follow a movement of the wind turbine part being lifted, thereby to maintain it in a position proximate said wind turbine part being lifted concurrently with a movement of said wind turbine part being lifted.

5. The method of claim 1, wherein said shield is an aerodynamic body, wherein said shield is a kite or power kite.

6. The method of claim 1, wherein said shield is collapsible, and wherein said shield may be collapsed by operating a control wire associated with said shield.

7. The method of claim 1, wherein said shield is held aloft using one or more tethered control wires.

8. The method of claim 7, further including providing a winch associated with the one or more tethered control wires or each of the one or more tethered control wires.

9. The method of claim 8, said method further including controlling a spatial position of said shield by operating one or more said winch.

10. The method according to claim 8, wherein said winch is comprised in a winch module, said winch module comprising ballast or capable of receiving ballasting material.

11. The method according to claim 10, wherein said winch module is received on a mobile transport unit or stationary and supported on the ground or suspended from a second lifting apparatus.

12. The method according to claim 8, further including a shield flying control system configured to actuate one or more said winch and configured to control the flight of said shield proximate to said wind turbine part being lifted.

13. The method of claim 7, wherein said one or more tethered control wires includes one or more power cable and one or more brake cable, wherein said one or more power cable is associated with a steering winch while said one or more brake cable is associated with a brake winch.

14. The method of claim 13, including steering said shield by means of one or more steering winch and one or more brake winch.

15. The method according to claim 1, carried out in connection with a wind turbine construction operation where said lifting apparatus is a crane; or carried out in connection with a wind turbine service operation where said lifting apparatus is a nacelle crane or nacelle winch.

16. The method according to claim 1, carried out by means of an automatic control system configured for manipulating said shield; further including providing a position transponder at one or both of the wind turbine part being lifted and the shield, said position transponder providing current positional information of one or both of the wind turbine part being lifted and the shield to said control system.

17. The method according to claim 1, further including providing said shield with a wireless position-indicator; and further including providing said wind turbine part with a wireless position-indicator.

18. A method of shielding a wind turbine part at a wind turbine site, the method including:
  providing a shield comprising an aerodynamic body in the form of a kite or power kite;
  providing a manipulation equipment associated with said shield; and
  the method further including;
  holding said shield, proximate and upwind of said wind turbine part, said shield being held aloft by means of said manipulation equipment;
  wherein said wind turbine part is a wind turbine rotor blade or a wind turbine nacelle; and
  wherein said method is performed during a servicing operation at the wind turbine rotor blade or nacelle; or wherein said method is performed during a rotation operation of the rotor blade at a wind turbine rotor.

* * * * *